US012722416B2

(12) United States Patent

Nam et al.

(10) Patent No.: US 12,722,416 B2

(45) Date of Patent: Sep. 1, 2026

(54) SHARP TYPE PAINT MARKER PEN

(71) Applicant: Mungyo ONS Corporation, Gimhae-si (KR)

(72) Inventors: Myeong Seok Nam, Busan (KR); Gang Sung Lee, Gimhae-si (KR)

(73) Assignee: Mungyo ONS Corporation, Gimhae-si (KR)

( * ) Notice: Subject to any disclaimer, the term of this patent is extended or adjusted under 35 U.S.C. 154(b) by 0 days.

(21) Appl. No.: 18/951,083

(22) Filed: Nov. 18, 2024

(65) Prior Publication Data

US 2025/0303778 A1 Oct. 2, 2025

(30) Foreign Application Priority Data

Apr. 1, 2024 (KR) ........................ 10-2024-0043899

(51) Int. Cl.

*B43K 5/18* (2006.01)
*B43K 5/02* (2006.01)

(52) U.S. Cl.

CPC . *B43K 5/18* (2013.01); *B43K 5/02* (2013.01)

(58) Field of Classification Search

CPC .... B43K 5/1863; B43K 5/1872; B43K 5/145; B43K 5/1836

USPC .......................................................... 401/206

See application file for complete search history.

(56) References Cited

U.S. PATENT DOCUMENTS 2,330,053 A * 9/1943 Herb .................... B43K 5/1845 401/206
3,589,824 A * 6/1971 Andrews .............. B43K 5/1872 401/206
3,682,559 A * 8/1972 Hirota .................. A45D 34/042 401/206
5,035,525 A 7/1991 Konose
5,749,665 A * 5/1998 Kato ........................ B43K 8/02 401/206
6,276,860 B1 8/2001 Nakajima et al.
6,817,802 B2 * 11/2004 Nishitani ............. B43K 5/1845 401/206
7,976,236 B2 * 7/2011 Oomoto ................... B43K 8/02 401/206

(Continued)

FOREIGN PATENT DOCUMENTS

DE 102015009743 A1 2/2017
DE 102017011173 B4 12/2021

(Continued)

OTHER PUBLICATIONS

The extended European search report of EP 24 21 3030, Apr. 8, 2025.

*Primary Examiner* — David P Angwin
*Assistant Examiner* — Bradley S Oliver
(74) *Attorney, Agent, or Firm* — STIP Law Group, LLC

(57) ABSTRACT

The present disclosure relates to a sharp type paint marker pen in which the convenient use thereof is provided because an ink is easily discharged through the Bernoulli's principle in accordance with a pressing action of an ink tank, the operation efficiency thereof is increased, a relatively inexpensive polyester nib is also able to be used instead of an expensive acrylic nib, a product lineup is able to be expanded using a watercolor marker or the like when a brush nib is applied, a high viscosity ink is also able to be applied, and it is also able to be expanded into other industries such as manicure.

7 Claims, 8 Drawing Sheets

(56) References Cited

U.S. PATENT DOCUMENTS 11,186,114 B2 11/2021 Sato

FOREIGN PATENT DOCUMENTS

| | | | |
|---|---|---|---|
| JP | 2001063278 | A | 3/2001 |
| JP | 2021146538 | A | 9/2021 |
| JP | 2021192975 | A | 12/2021 |
| KR | 200187567 | Y1 | 7/2000 |
| KR | 20190020387 | A | 3/2019 |
| KR | 102603811 | B1 | 11/2023 |

* cited by examiner

SHARP TYPE PAINT MARKER PEN

CROSS-REFERENCE TO RELATED APPLICATIONS

This application claims the priority of the Korean Patent Applications NO 10-2024-0043899, filed on Apr. 1, 2024, in the Korean Intellectual Property Office. The entire disclosures of all these applications are hereby incorporated by reference.

BACKGROUND

1. Field

The present disclosure relates to a sharp type paint marker pen, and more particularly to a sharp type paint marker pen in which the convenient use thereof is provided because an ink is easily discharged through the Bernoulli's principle in accordance with a pressing action of an ink tank, the operation efficiency thereof is increased, a relatively inexpensive polyester nib is also able to be used instead of an expensive acrylic nib, a product lineup is able to be expanded using a watercolor marker or the like when a brush nib is applied, a high viscosity ink is also able to be applied, and it is also able to be expanded into other industries such as manicure.

2. Description of the Related Art

Generally, marker pens are widely used writing instruments which are developed with a nib at the tip and an ink tank at the rear to supply ink and allow writing.

As an example in the related art, Korean Unexamined Patent Publication No. 10-2019-0020387 discloses a board marker pen including an ink stopper which includes a transparent ink-receiving portion which has a liquid ink received therein and has a closed one end; a film which surrounds the ink-receiving portion by making a region except for one or more residual amount indication portions opaque so that the remaining amount of the liquid ink received in the ink-receiving portion is visually identified; a lead support portion which is joined to an opening portion of the ink-receiving portion, to which a lead (nib), an inner end of which is surrounded by a filter, is joined; an ink stopper which is disposed between the ink-receiving portion and the filter, and which is formed so that the ink-receiving portion or two ink passages through which the filter-side liquid ink smoothly circulates to an opposite side pass therethrough; and a cap which is joined to the lead support portion in an attachable/detachable manner.

Also, as another example, Registered Korean Utility Model Publication No. 20-0187567 discloses a marker pen which has a spray type ink storage bottle.

All of these techniques in the related art are of the type in which an ink is released by pressing the front portion (nib), but the nib is easily damaged and needs to be reinforced and thus acrylic materials are used. Here, the unit price is high, the nib is hard and does not provide a good writing feel, and the parts need to be pressed to check for ink leaks, which contaminates the parts, making it inconvenient to use and unclean.

Also, although the ink tank is opened and an ink needs to flow out if the back side of the marker pen is pressed downward, there is a disadvantage in that an ink does not flow out due to external atmospheric pressure and surface tension.

DOCUMENTS IN RELATED ART

Patent Documents

Korean Unexamined Patent Publication No. 10-2019-0020387 (published on Mar. 4, 2019)
Registered Korean Utility Model Publication No. 20-0187567 (published on Jul. 15, 2000)

SUMMARY

The present disclosure is intended to address the above matters, and the present disclosure is for the purpose of providing a sharp type paint marker pen which has a discharge structure in which an ink is allowed to be easily discharged through the Bernoulli's principle in accordance with a pressing motion of an ink tank, a convenient use thereof is provided, and operation efficiency thereof is able to be improved.

Also, the present disclosure is for the purpose of providing a sharp type paint marker pen in which a relatively inexpensive polyester nib is able to be used instead of an expensive acrylic nib and material costs are able to be saved.

Furthermore, the present disclosure is for the purpose of providing a sharp type paint marker pen in which the application of a brush nib is enabled, a product lineup is able to be expanded using a watercolor marker or the like, a high viscosity ink is able to be applied, it is also able to be expanded into other industries such as manicure, and the efficiency of the product is maximized.

The technical matters of the present disclosure are not limited to the technical matters described above and other technical matters not described will be clearly understood by those skilled in the art from the description which will be provided below.

A sharp type paint marker pen having an ink discharge structure according to an example embodiment of the present disclosure for achieving the above purpose includes a main body portion, an ink tank which is joined to an inside of the main body portion, an inner rod which is inserted into the ink tank, an ink discharge portion which is fixed to the main body portion and through which an ink is discharged, and a nib which is joined to the ink discharge portion.

According to an example embodiment of the present disclosure, the main body portion includes a frame which has a pipe shape, and a guide plate provided inside the frame.

According to an example embodiment of the present disclosure, a first groove to which the ink discharge portion is joined is formed on the left side of an inner diameter of the frame and a second groove to which the ink tank is joined is formed on a right side of the inner diameter of the frame.

According to an example embodiment of the present disclosure, the guide plate is composed of a vertical portion formed on the inner diameter of the frame, a horizontal portion which protrudes toward a left side of the vertical portion, and a joint portion formed at an end on a left side of the horizontal portion.

According to an example embodiment of the present disclosure, a fourth protrusion piece to which the inner rod is joined is formed on the inner side of the horizontal portion.

According to an example embodiment of the present disclosure, the ink tank includes an ink tank main body which has an ink included therein, and a finishing member that is joined to a rear of the ink tank main body in an attachable/detachable manner.

According to an example embodiment of the present disclosure, the ink tank main body is composed of a rear end portion having a female thread formed so that a finishing member is allowed to be fastened to a rear inner diameter, a middle end portion which is provided in the front of the rear end portion and has a diameter which becomes smaller as it goes forward, and a front end portion which is provided in the front of the middle end portion and has a third protrusion piece formed at an outer diameter of an end on a left side.

According to an example embodiment of the present disclosure, the finishing member is composed of a fastening portion which has a male thread formed to be fastened to the female thread of the rear end portion, and a handle portion formed at a rear end of the fastening portion.

According to an example embodiment of the present disclosure, the inner rod is composed of an inlet portion through which an ink of the ink tank flows, a joint portion which is provided on one side of the inlet portion and joined to the main body portion, and a stopper portion which is provided on the other side of the inlet portion.

According to an example embodiment of the present disclosure, a flow path through which an ink passes is formed between an outside of the inlet portion and the ink tank.

According to an example embodiment of the present disclosure, an outer diameter of the inlet portion has a plurality of guide protrusions formed in a longitudinal direction.

According to an example embodiment of the present disclosure, a partition wall is formed on a side surface of the stopper portion.

According to an example embodiment of the present disclosure, the ink discharge portion includes a discharge main body through which an ink flowing-in through the inner rod is discharged and a nib fixture portion to which a nib is joined is provided in the front of the discharge main body.

According to an example embodiment of the present disclosure, an absorbent storage portion which absorbs an ink is joined inside the discharge main body.

As described above, according to an example embodiment of the present disclosure, the flow path is formed such that the ink tank and the inner rod the partition wall is formed on the side surface of the inner rod so that an ink passes through the flow path through the Bernoulli's principle in accordance with a pressing motion of the ink tank and is easily discharged to the ink discharge portion, thereby improving operation efficiency and product quality.

The effects of the present disclosure are not limited to the effects described above and other effects not described will be clearly understood by those skilled in the art from the description which will be provided below.

DETAILED DESCRIPTION

Figure 1:
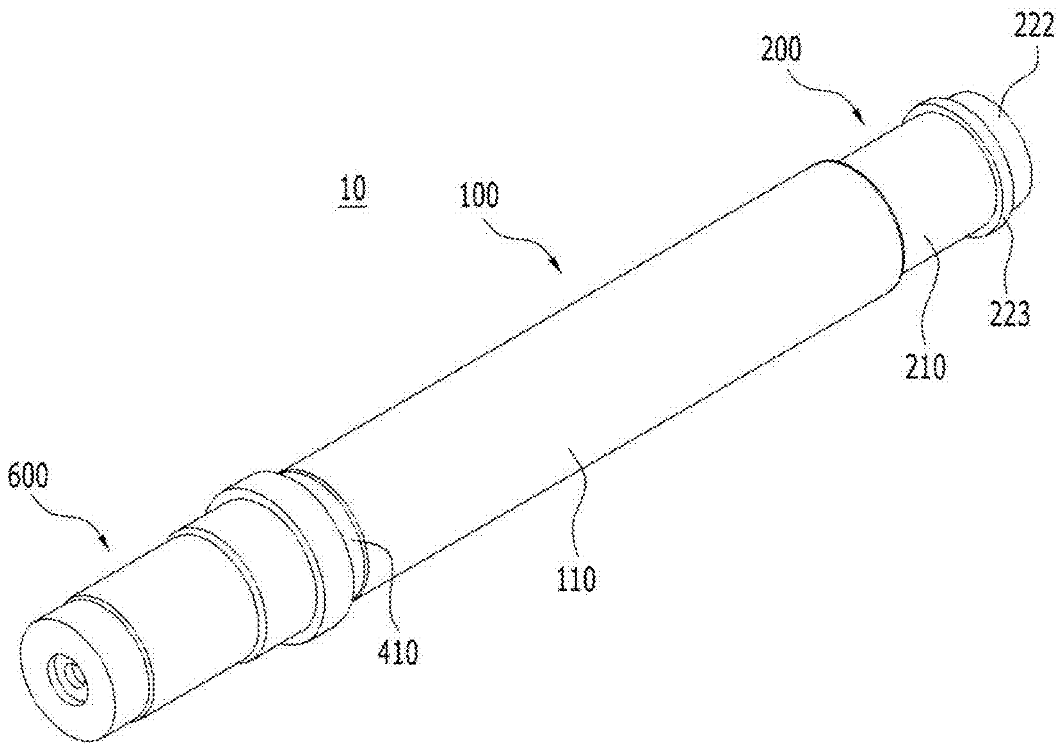
FIG. 1 is a perspective view showing a state in which a cap of a sharp type paint marker pen is joined according to the present disclosure.
Figure 2:
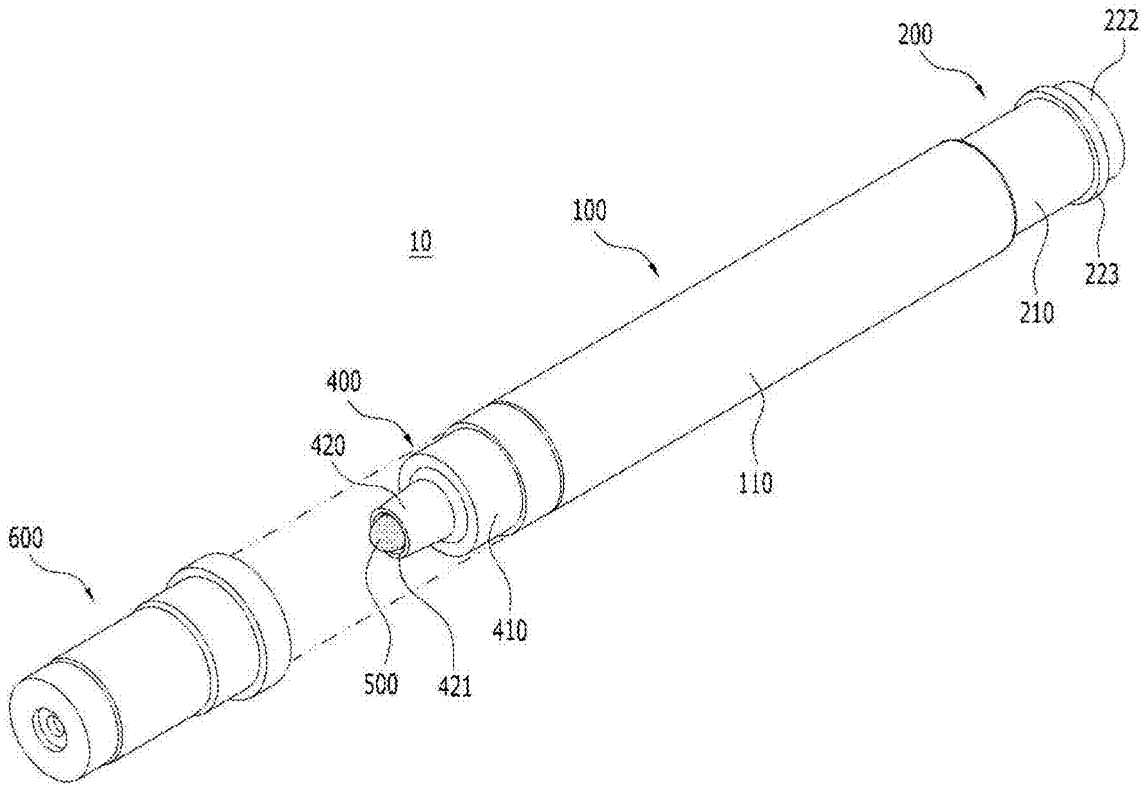
FIG. 2 is an exploded perspective view showing a state in which the cap of the sharp type paint marker pen is removed according to the present disclosure.

Preferred embodiments of the present disclosure will be described in detail below with reference to the attached drawings. The features and the advantages of the present disclosure and the means for implementing them will become apparent through the detailed description of embodiments together with the attached drawings. Here, the embodiments of the present disclosure which will be described below are merely exemplary and are not intended to limit the scope of the present disclosure to the described embodiments. Furthermore, the constituent elements of each of the example embodiments may be combined in various ways in the example embodiment or between the example embodiments, as long as there is no other mention or inconsistency between them.

As shown in FIGS. 1 to 4, a sharp type paint marker pen according to an example embodiment of the present disclosure includes a main body portion 100, an ink tank 200, an inner rod 300, an ink discharge portion 400, a nib 500, and a cap 600.

Figure 3:
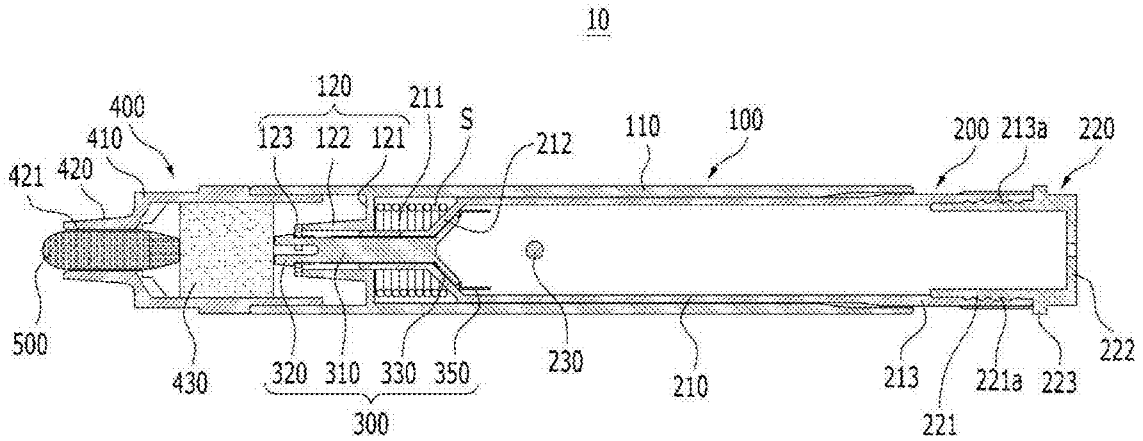
FIG. 3 is a cross-sectional view of the sharp type paint marker pen in which the cap is removed according to the present disclosure.
Figure 4:
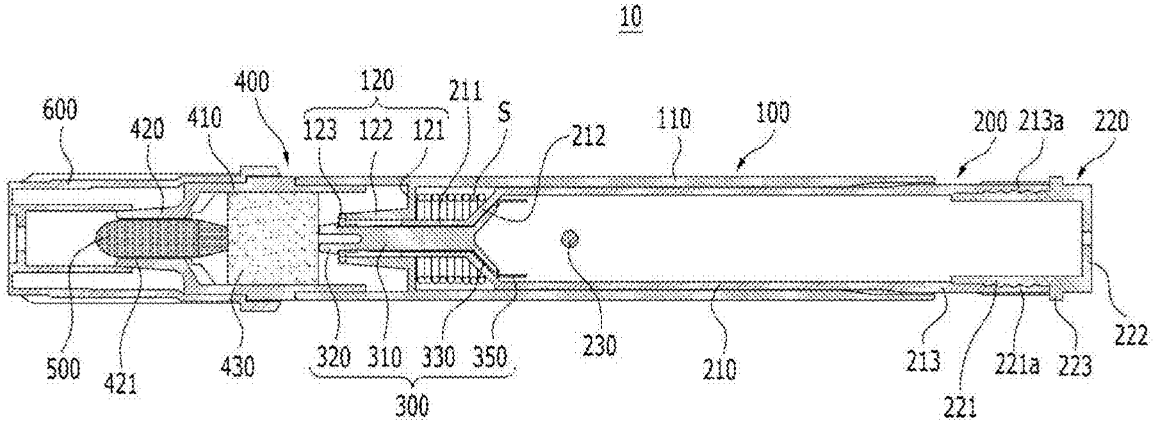
FIG. 4 is a cross-sectional view showing a state in which the cap of the sharp type paint marker pen is joined according to the present disclosure.

Referring to FIGS. 3 and 4, the main body portion 100 has an exterior form in which it may be held by a user and includes a frame 110 having a pipe shape and a guide plate 120 provided inside the frame 110. On the other hand, the exterior shape of the frame 110 is circular, but may be formed into various shapes such as a triangle, a square, and a hexagon.

Figure 5:
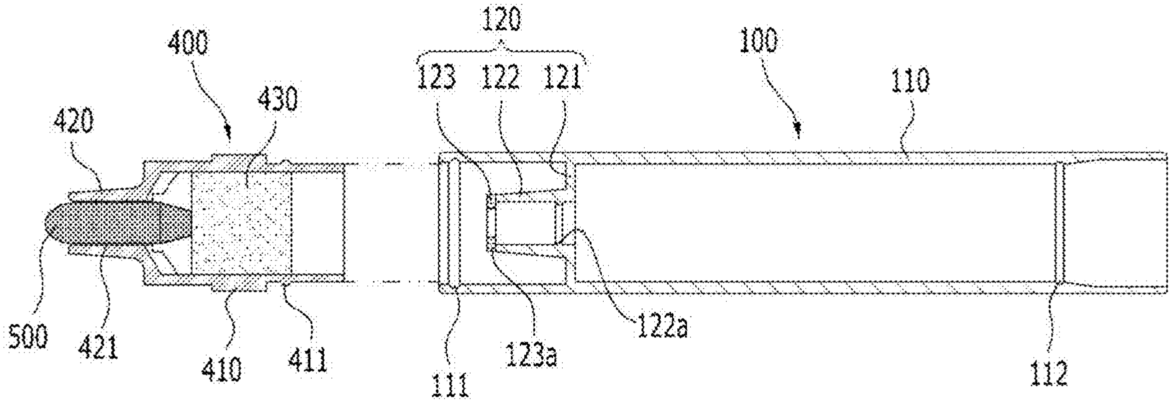
FIG. 5 is a cross-sectional view showing a state before a main body portion and an ink discharge portion of the sharp type paint marker pen are joined according to the present disclosure.

As shown in FIG. 5, the frame 110 may have a first groove 111 which is formed on a left side of an inner diameter thereof and configured to connect the ink discharge portion 400 and a second groove 112 which is formed on a right side of the inner diameter thereof and configured to connect the ink tank 200. At this time, the first groove 111 and the second groove 112 may be formed around the inner diameter of the frame 110. Thus, the ink discharge portion 400 and the ink tank 200 may be smoothly joined to the frame 110.

The guide plate 120 may be provided integrally inside the frame 110.

Also, the guide plate 120 may be composed of a vertical portion 121 which is formed on the inner diameter of the frame 110, a horizontal portion 122 which protrudes toward a left side of the vertical portion 121 and into which the inner rod 300 is inserted; and a joint portion 123 which is formed at a left end of the horizontal portion 122 and to which the inner rod 300 is joined. On the other hand, the vertical portion 121 may be formed to have a ring shape, the horizontal portion 122 may be formed to have a pipe shape, and the joint portion 123 may be formed to have a ring shape.

A fourth protrusion piece 122*a* may be formed on an inner side of the horizontal portion 122 to which the inner rod 300 is joined. At this time, the fourth protrusion piece 122*a* is formed to have the shape of a protrusion portion formed in a circumferential direction.

An inner diameter of the joint portion 123 is formed to be smaller than an inner diameter of the horizontal portion 122. Furthermore, a plurality of flow holes 123*a* are formed radially in the joint portion 123 so that an ink of the ink tank 200 is discharged to the ink discharge portion 400.

The ink tank 200 is attached to the inside of the main body portion 100 and has an ink included therein.

Figure 7:
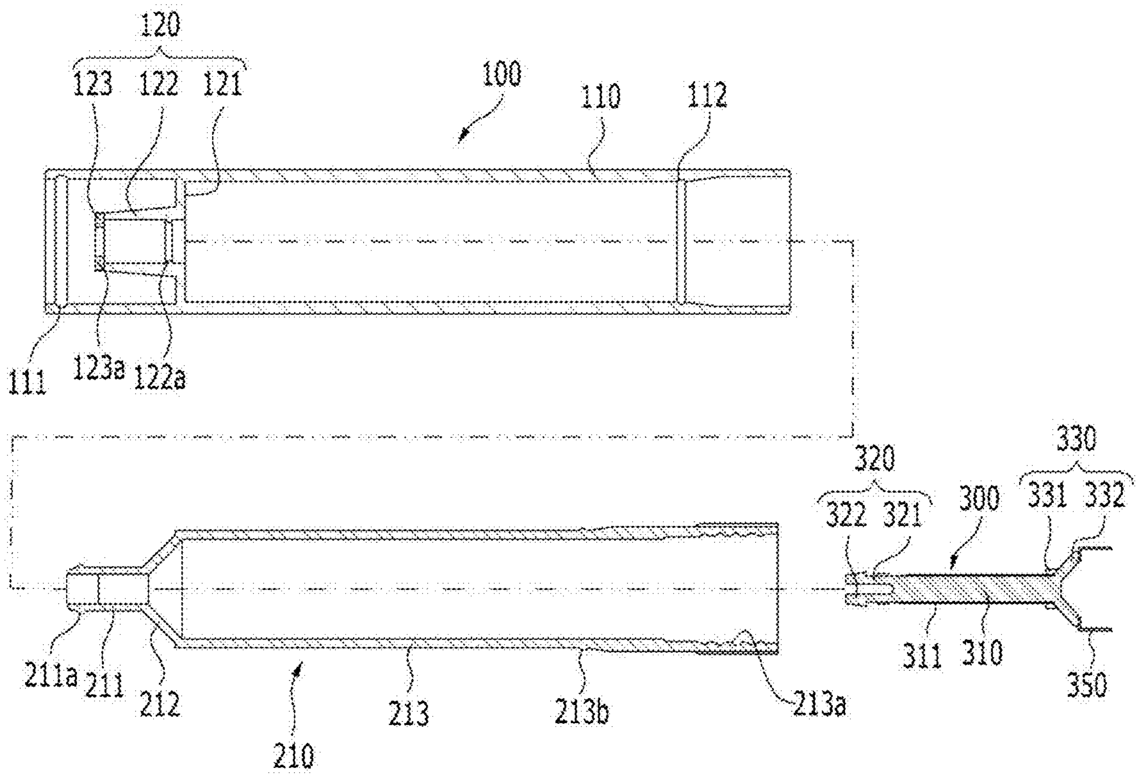
FIG. 7 is a cross-sectional view showing a state before the main body portion, an ink tank, and an inner rod of the sharp type paint marker pen are joined according to the present disclosure.
Figure 8:
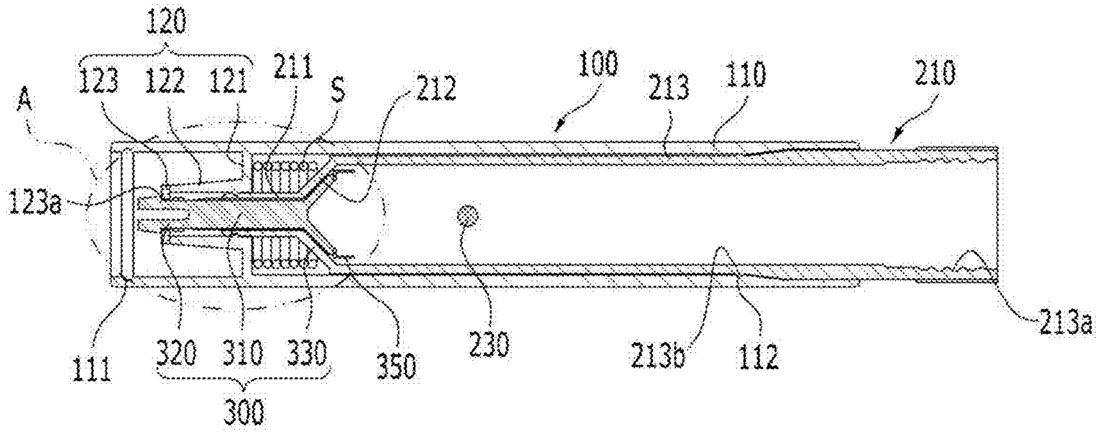
FIG. 8 is a cross-sectional view showing a state in which the main body portion, ink tank, and inner rod of a sharp type paint marker pen are joined according to the present disclosure.

Referring to FIGS. 7 and 8, the ink tank 200 is composed of an ink tank main body 210 and a finishing member 220.

The ink tank main body 210 is composed of, from a left side to a right side, a front end portion 211, a middle end portion 212, and a rear end portion 213.

The front end portion 211 is formed to have a pipe shape and a third protrusion piece 211*a* having a ring shape is formed on an outer diameter of the left end. At this time, the third protrusion piece 211*a* is formed in the form of a protrusion portion formed in a circumferential direction. Thus, the third protrusion piece 211*a* and the fourth protrusion piece 122*a* are formed in the form of the protrusion portion formed in the circumferential direction. Thus, when the ink tank 200 is joined to the frame 110, since the third protrusion piece 211*a* rides over the fourth protrusion piece 122*a* of the horizontal portion 122 and the third protrusion piece 211*a* is located on the left side of the fourth protrusion piece 122*a*, the ink tank 200 will not fall out easily unless it is pulled forcibly.

The middle end portion 212 is formed integrally at the rear of the front end portion 211 and is formed so that a diameter thereof increases from the front to the rear.

Also, as shown in FIGS. 3 and 8, a coil spring S is installed between the vertical portion 121 of the guide plate 120 and the middle end portion 212 of the ink tank main body 210. Thus, if the user applies a force to move the ink tank main body 210 in a direction in which the guide plate 120 is formed, the coil spring S is compressed, and if the user releases the force, the coil spring S returns to an original state thereof.

The rear end portion 213 is formed to have a pipe shape and has an ink stored therein.

Also, the rear end portion 213 has a female thread 213*a* formed in the rear inner diameter to which the finishing member 220 is fastened and a second protrusion piece 213*b* formed on the outside to be joined to the second groove 112 of the frame 110. At this time, the second protrusion piece 213*b* may be formed to have a ring shape at a point ⅔ from the left side to the right side.

On the other hand, a bead (ball) 230 may be inserted into the ink tank main body 210. The bead (ball) 230 helps so that an ink is mixed well.

The finishing member 220 is joined in an attachable/detachable manner through screw assembly to the rear end portion 213 of the ink tank main body 210. That is to say, by separating the finishing member 220 from the ink tank main body 210, injecting an ink into the ink tank main body 210, and closing the finishing member 220 to use it, refilling of the ink and the use of it are possible.

Also, the finishing member 220 is composed of a fastening portion 221 having a male thread 221*a* formed therein to be fastened to the female thread 213*a* of the rear end portion 213 and a handle portion 222 formed at the rear end of the fastening portion 221.

A locking claw 223 protruding outward is formed at a contact point between the fastening portion 221 and the handle portion 222. The locking claw 223 is engaged with the end of the rear end portion 213.

The inner rod 300 is inserted into the ink tank main body 210 and joined to the guide plate 120 of the main body portion 100.

Figure 9:
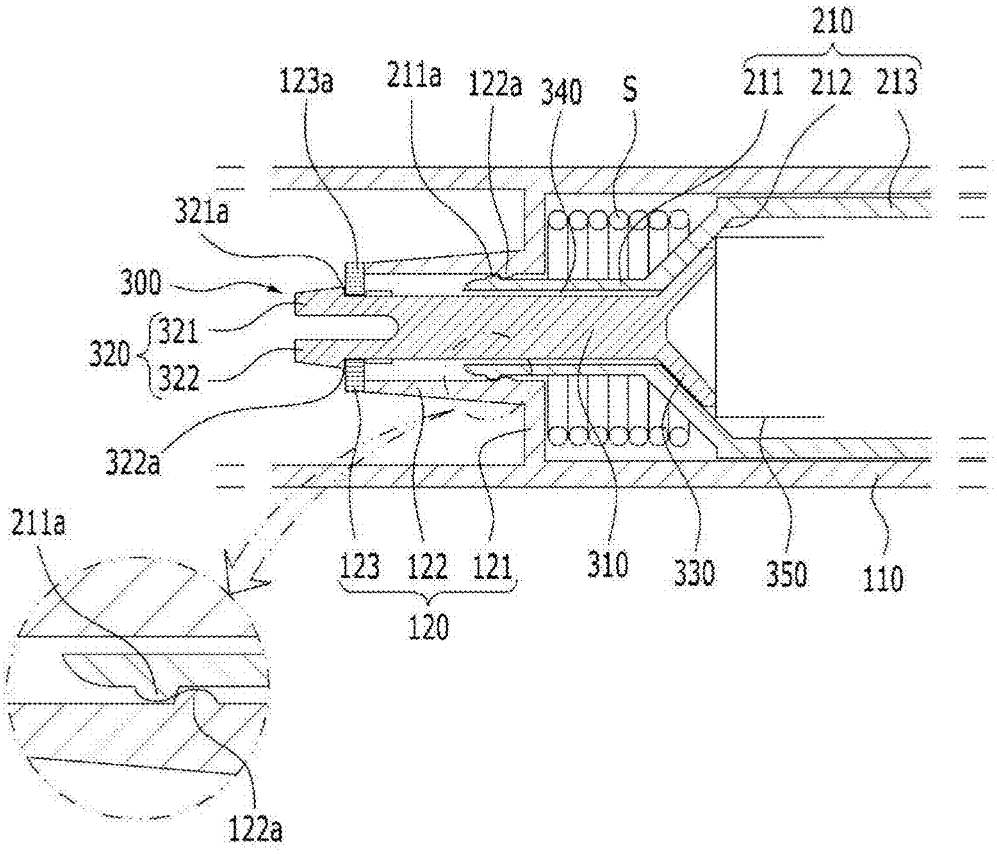
FIG. 9 is an enlarged view of portion 'A' of FIG. 8.

Referring to FIG. 9, the inner rod 300 is composed of an inlet portion 310 through which ink flows, a joint portion 320 provided on one side of the inlet portion 310 and joined to the main body portion 100, and a stopper portion 330 provided on the other side of the inlet portion 310.

The inlet portion 310 is formed to have a cylindrical shape and a plurality of guide protrusions 311 are formed radially on the outer diameter. At this time, the guide protrusions 311 are formed long along the length of the inlet portion 310 and the inner rod 300 is supported by an inner surface of the ink tank 200.

Figure 12:
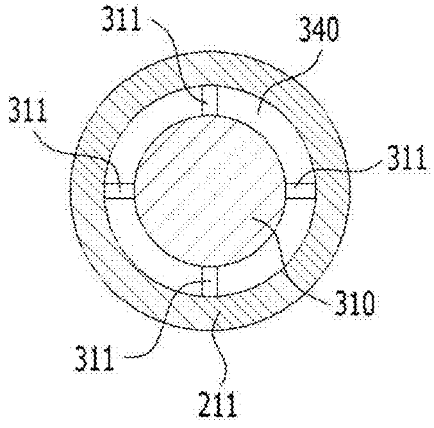
FIG. 12 is a cross-sectional view taken along line B-B of FIG. 11.

Also, as shown in FIGS. 9 and 12, a flow path 340 is formed between the exterior of the inlet portion 310 and the front end portion 211 of the ink tank 200 so that an ink is allowed to pass therethrough. The joint portion 320 is formed to protrude from one side of the inlet portion 310 and is composed of an upper joint portion 321 and a lower joint portion 322 which are spaced symmetrically from each other at a set distance. The upper joint portion 321 is formed to protrude upward and an upper insertion groove 321*a* is formed in the upper portion. The lower joint portion 322 is formed to protrude downward and a lower insertion groove 322*a* is formed in the lower portion. That is to say, an end portion of the joint portion 123 of the guide plate 120 is inserted into the upper insertion groove 321*a* and the lower insertion groove 322*a* formed in the upper joint portion 321 and the lower joint portion 322. Thus, the inner rod 300 is joined to the main body portion 100.

The stopper portion 330 is composed of a first short claw 331 formed integrally at the rear of the inlet portion 310 and a second short claw 332 formed at the rear of the first short claw 331. The first short claw 331 and the second short claw 332 are formed to have a ring shape.

Also, the first short claw 331 is formed to have a larger diameter than the inlet portion 310 and the second short claw 332 is formed to have a larger diameter toward the rear.

Figure 11:
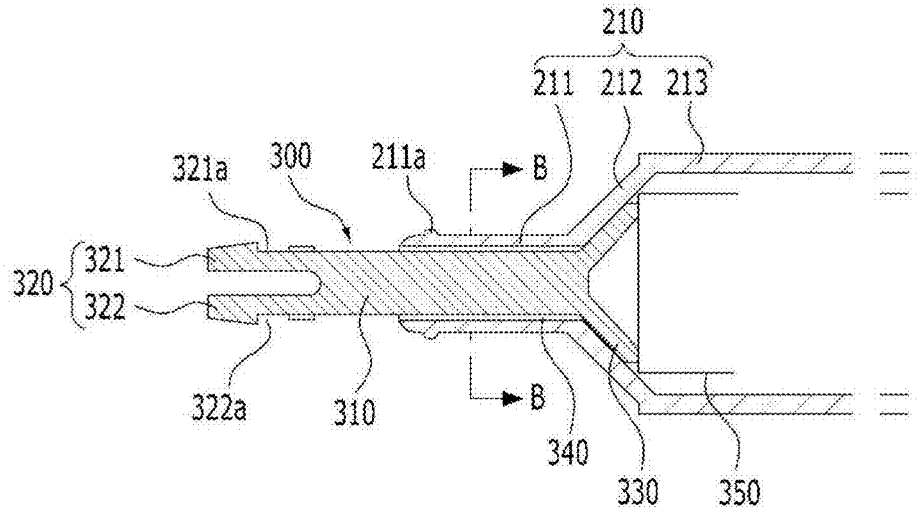
FIG. 11 is an enlarged cross-sectional view showing a state in which the ink tank and the inner rod of the sharp type paint marker pen are joined according to the present disclosure.

As shown in FIGS. 7 and 11, a partition wall 350 is formed on a side surface of the second short claw 332. The partition wall 350 is formed in the longitudinal direction of the marker pen 10 and the vertical cross section is formed to have a circular shape.

Figure 10:
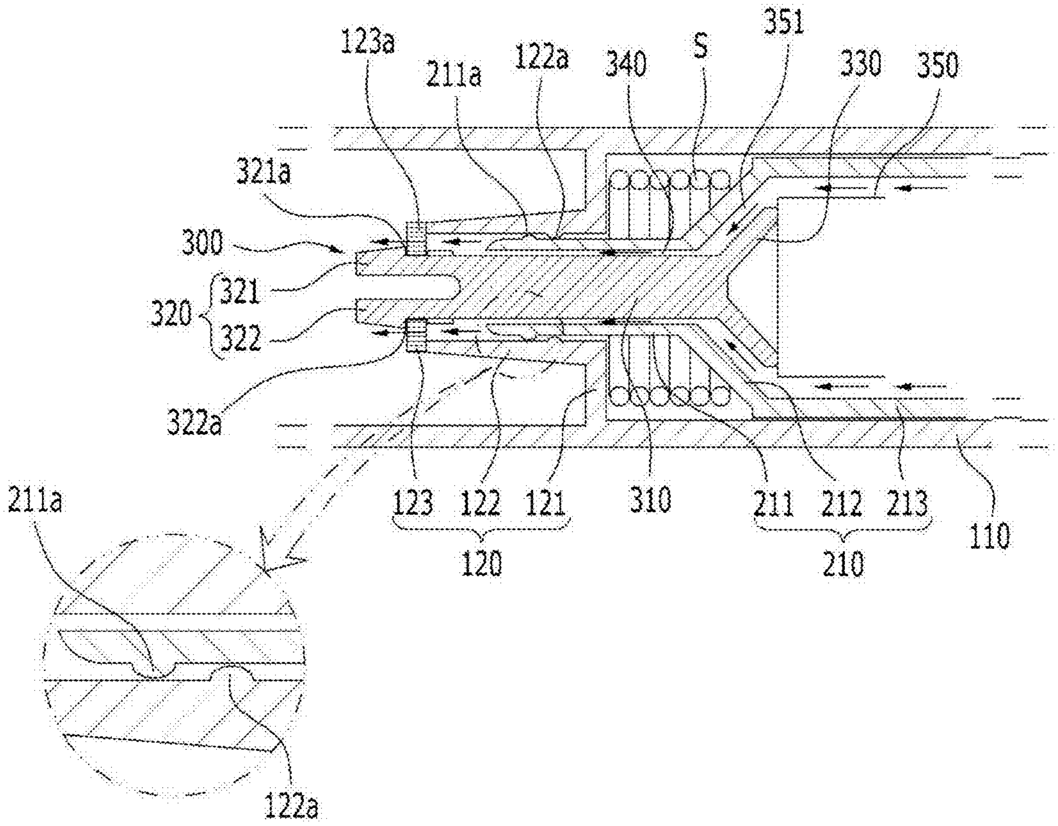
FIG. 10 is a cross-sectional view showing a state in which an ink is discharged in the enlarged view of portion 'A' of FIG. 8.

A diameter of the partition wall 350 is formed larger than a diameter of the stopper portion 330. In addition, as shown in FIG. 10, a gap 351 is formed between the partition wall 350 and the ink tank 200 in accordance with a pressing motion of the ink tank 200 and an ink of the ink tank 200 is discharged into the gap 351.

The ink discharge portion 400 is fixed to the front of the main body portion 100 and an ink which passes through the flow path 340 and the flow holes 123*a* is absorbed and discharged through the nib 500.

Figure 6:
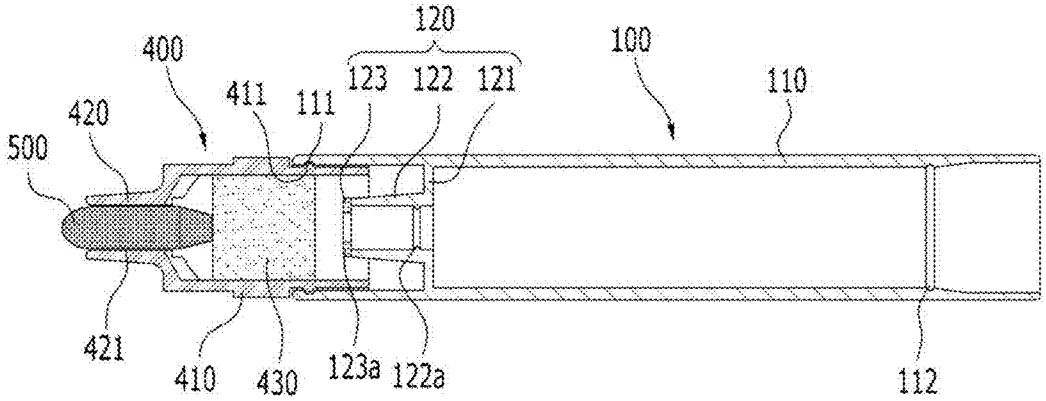
FIG. 6 is a cross-sectional view showing a state in which the main body portion and the ink discharge portion of the sharp type paint marker pen are joined according to the present disclosure.

Referring to FIGS. 5 and 6, the ink discharge portion 400 includes a discharge main body 41 through which an ink which has passed through the flow path 340 of the inner rod 300 and the flow holes 123*a* is introduced and discharged and a nib fixture portion 420 to which the nib 500 is joined in the front of the discharge main body 410.

The discharge main body 410 is formed to have a pipe shape in which it is formed stepwise. In addition, an absorbent storage portion 430 which absorbs an ink flowing-in through the flow holes 123*a* is forcibly joined inside the discharge main body 410.

The absorbent storage portion 430 is formed to have a cylindrical shape and it is preferable to use a sponge or a filter configured to absorb the flowing-in ink.

Also, a first protrusion piece 411 is formed on an outer diameter of the discharge main body 410 to fit into the first groove 111 of the main body portion 100 so that the ink discharge portion 400 may be joined to the main body portion 100.

The nib fixture portion 420 is formed to have a diameter smaller than that of the discharge main body 410. In addition, a joint groove 421 to which the nib 500 is joined is formed inside the nib fixture portion 420.

The nib 500 is force-fitted into the joint groove 421 of the nib fixture portion 420 and is formed to have a cylindrical shape, but is not limited thereto. On the other hand, the nib 500 is joined to the nib fixture portion 420 so that a part of the nib 500 is exposed to the outside for writing at the time of being joined to the nib fixture portion 420.

Moreover, the nib 500 is joined so that a rear end thereof is in contact with the absorbent storage portion 430. Thus, an ink absorbed in the absorbent storage portion 430 is discharged through the nib 500.

On the other hand, a brush may be used instead of the nib. Thus, by using a brush, the brush may be used for watercolors, nail polish, and the like.

As shown in FIGS. 1 and 4, the cap 600 is joined to the ink discharge portion 400 and seals the nib 500 so that the cap 600 does not dry out or become damaged.

As described above, the present disclosure states that the middle end portion 212 of the ink tank main body 210 and the outer surface of the stopper portion 330 come into contact with each other so that the ink tank 200 is sealed without being discharged.

Furthermore, although the ink tank 200 moves longitudinally if the finishing member 220 of the ink tank 200 is pressed, since the inner rod 300 remains in place, the ink tank 200 is opened. At this time, although the ink needs to flow downward, the external atmospheric pressure and surface tension prevent the ink from flowing out.

Therefore, by adjusting the gap between the ink tank 200 and the inner rod 300, the ink inside the ink tank 200 moves to the lower side, overcomes the surface tension, and flows out to the lower side. Thus, as the ink passes through the narrow space of the gap 351 between the stopper portion 330 formed at the rear of the inner rod 300 and the middle end portion 212 of the ink tank main body 210, the speed increases so that the ink is easily discharged in accordance with Bernoulli's principle.

Also, if the inner surface of the middle end portion 212 moves away from the outer surface of the stopper portion 330, an ink stored inside the ink tank main body 210 moves to the gap 351 between the stopper portion 330 and the middle end portion 212 and to the flow path 340 between the front end portion 211 and the inlet portion 310.

Furthermore, as an ink flows into the flow path 340, the ink moves to the absorbent storage portion 430 of the discharge main body 410 through the flow holes 123*a* of the joint portion 123 and the ink of the absorbent storage portion 430 flows to the nib 500.

The detailed description of the present disclosure described above has described only specific embodiments thereof. Here, it should be understood that the present disclosure is not limited to the specific forms described in the detailed description, but rather includes all modifications, equivalents, and alternatives falling within the spirit and scope of the present disclosure as defined by the appended claims.

EXPLANATIONS OF SYMBOLS

10: Marker pen
100: Main body portion
110: Frame
111: First groove
112: Second groove
120: Guide plate
121: Vertical portion
122: Horizontal portion
122*a*: Fourth protrusion piece
123: Joint portion
123*a*: Flow hole
200: Ink tank
210: Ink tank main body
211: Front end portion
211*a*: Third protrusion piece
212: Middle end portion
213: Rear end portion
213*a*: Female thread
213*b*: Second protrusion piece
220: Finishing member
221: Fastening portion
221*a*: Male thread
222: Handle portion
223: Locking claw
230: Bead (ball)
300: Inner rod
310: Inlet portion
311: Guide protrusions
320: Joint portion
321: Upper joint portion
321*a*: Upper insertion groove
322: Lower joint portion
322*a*: Lower insertion groove
330: Stopper portion
331: First short claw
332: Second short claw
340: Flow path
350: Partition wall
351: Gap
400: Ink discharge portion
410: Discharge main body
411: First protrusion piece
420: Nib fixture portion
421: Joint groove
430: Absorbent storage portion
500: Nib
600: Cap
S: Coil spring

What is claimed is:

1. A sharp type paint marker pen, comprising:

a main body portion having a frame and a guide plate integrally provided therein, the guide plate comprising a vertical portion, a horizontal portion, and a joint portion formed at an end of the horizontal portion, wherein an inner diameter of the joint portion is smaller than an inner diameter of the horizontal portion, and wherein a plurality of flow holes are formed radially in the joint portion so that ink of an ink tank is discharged to the ink discharge portion;

an ink tank movably joined to an inside of the main body portion, the ink tank comprising:

a front end portion, a middle end portion having a diameter that becomes smaller as it goes forward, and a rear end portion having a female thread formed in a rear inner diameter therein;

a coil spring disposed between the guide plate and the middle end portion of the ink tank to bias the ink tank rearward;

an inner rod which is fixed to the guide plate and inserted into the ink tank, the inner rod comprising:

an inlet portion, a joint portion, and a stopper portion, wherein the joint portion of the inner rod comprises an upper joint portion having an upper insertion groove and a lower joint portion having a lower insertion groove, and wherein an end portion of the joint portion of the guide plate is inserted into the upper insertion groove and the lower insertion groove such that the inner rod is joined to the guide plate; and a partition wall formed on a side surface of the stopper portion to define a gap between the partition wall and the ink tank;

an ink discharge portion fixed to the main body portion and through which an ink is discharged; and a nib joined to the ink discharge portion;

wherein a flow path is formed between an outer surface of the inlet portion and the ink tank, and ink is discharged through the flow path, the plurality of flow holes, and the gap based on a pressure differential created in accordance with a pressing action applied to the ink tank.

2. The sharp type paint marker pen of claim 1, wherein the main body portion includes:

the frame which has a pipe shape, and the guide plate which is provided inside the frame.

3. The sharp type paint marker pen of claim 2, wherein a first groove to which the ink discharge portion is joined is formed on the left side of an inner diameter of the frame and a second groove to which the ink tank is joined is formed on a right side of the inner diameter of the frame.

4. The sharp type paint marker pen of claim 2, wherein the guide plate is composed of the vertical portion which is formed on the inner diameter of the frame, the horizontal portion which has a fourth protrusion piece to which the inner rod is joined formed therein and protrudes toward a left side of the vertical portion, and the joint portion which is formed at an end on a left side of the horizontal portion.

5. The sharp type paint marker pen of claim 1, wherein the ink tank includes an ink tank main body which has ink included therein, and a finishing member which is joined to a rear of the ink tank main body in an attachable/detachable manner, wherein the finishing member comprises a fastening portion having a male thread configured to be fastened to the female thread of the rear end portion, and a locking claw configured to engage an end of the rear end portion.

6. The sharp type paint marker pen of claim 1, wherein the flow path is formed between an outside of the inlet portion and the front end portion of the ink tank.

7. The sharp type paint marker pen of claim 1, wherein an outer diameter of the inlet portion has a plurality of guide protrusions formed in a longitudinal direction, and wherein the guide protrusions are configured to contact an inner surface of the ink tank to support the inner rod and maintain the flow path.

* * * * *